United States Patent [19]

Iseman

[11] Patent Number: 4,457,739

[45] Date of Patent: Jul. 3, 1984

[54] MULTI-RATIO DRIVE

[75] Inventor: Richard W. Iseman, Buffalo, N.Y.

[73] Assignee: Iseman Enterprises, Inc., Buffalo, N.Y.

[21] Appl. No.: 234,371

[22] Filed: Feb. 13, 1981

[51] Int. Cl.³ .............................................. F16H 11/00
[52] U.S. Cl. ......................................... 474/49; 474/69
[58] Field of Search ........................ 474/47, 49, 50, 52, 474/53, 160, 69; 192/64; 74/527

[56] References Cited

U.S. PATENT DOCUMENTS

| | | |
|---|---|---|
| 652,092 | 6/1900 | Desprez et al. |
| 663,928 | 12/1900 | Pratt . |
| 679,076 | 7/1901 | Johnston . |
| 1,428,999 | 9/1922 | Tygard et al. ........................ 474/47 |
| 1,663,414 | 4/1928 | Mize . |
| 2,049,065 | 7/1936 | Kahn . |
| 2,211,548 | 8/1940 | Schwinn ............................. 192/64 |
| 2,394,112 | 2/1946 | Schwinn ............................. 192/64 |
| 2,584,447 | 2/1952 | Hoyat . |
| 2,827,795 | 3/1958 | Callabros . |
| 3,269,212 | 8/1966 | Voland ................................. 74/527 |
| 3,782,210 | 1/1974 | Holleman . |
| 3,873,125 | 3/1975 | Dunder et al. . |
| 3,913,410 | 10/1975 | Ackerman . |
| 3,929,025 | 12/1975 | Perry . |
| 3,935,751 | 2/1976 | Lee . |
| 3,938,403 | 2/1976 | Donaldson . |
| 4,030,373 | 6/1977 | Leonard ............................. 474/49 |
| 4,056,013 | 11/1977 | Snyder . |
| 4,119,326 | 10/1978 | Porter . |
| 4,164,153 | 8/1979 | Moritsch . |
| 4,167,124 | 9/1979 | Zvetkov . |
| 4,342,559 | 8/1982 | Williams ............................. 474/49 |

FOREIGN PATENT DOCUMENTS

| | | | |
|---|---|---|---|
| 960014 | 1/1948 | France ................................. 474/47 |
| 1027817 | 11/1950 | France ................................. 474/160 |

Primary Examiner—John E. Murtagh
Assistant Examiner—Andrew Joseph Rudy
Attorney, Agent, or Firm—Joseph P. Gastel

[57] ABSTRACT

A multi-ratio drive including a first sprocket having a first plate with a plurality of concentric circular rows of holes therein for receiving pins in a fully retracted position, a second plate spaced from the first plate and coaxial therewith, a shifting mechanism for moving the retracted pins in a predetermined row from their retracted position to an extended position while causing any pins outside of the predetermined row to remain in a retracted position, a flexible chain having a plurality of spaced links each with a concave configuration for encircling the extended pins to thereby provide a driving engagement with the extended pins, a second sprocket spaced from the first sprocket and having a plurality of second concentric circular rows of holes for receiving second pins therein and a second shifting mechanism for moving the second pins between retracted positions where they are not engaged by the chain to an extended position where they are so engaged so as to provide a driving relationship of a predetermined ratio between the first and second sprockets.

24 Claims, 28 Drawing Figures

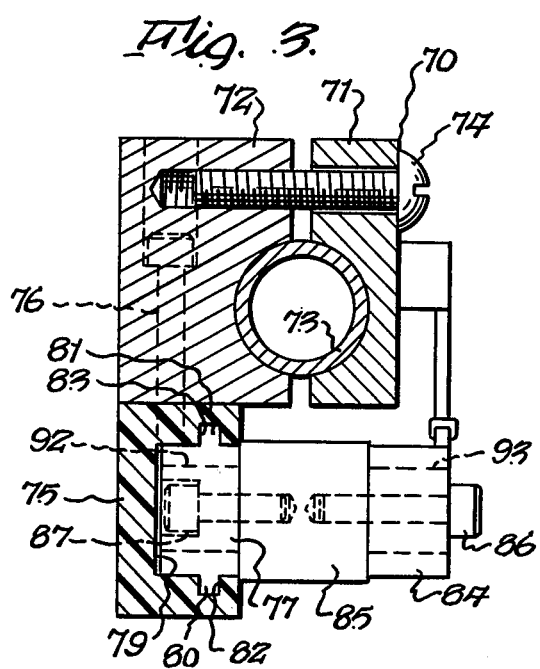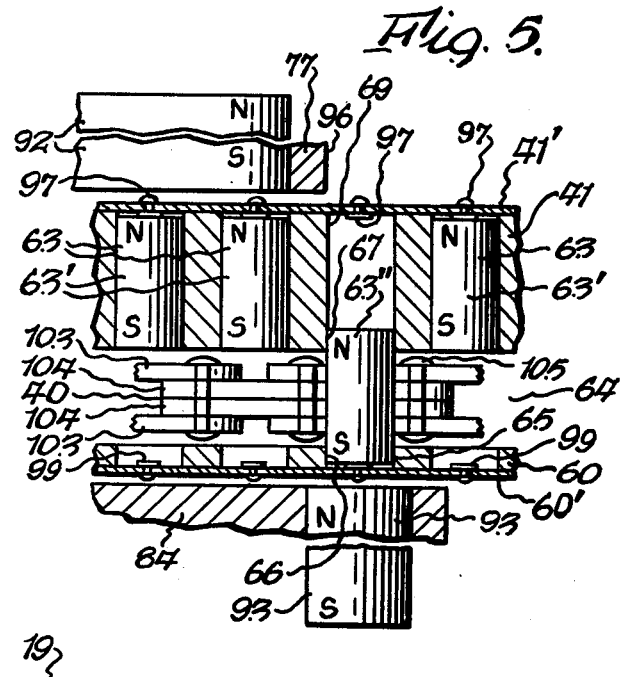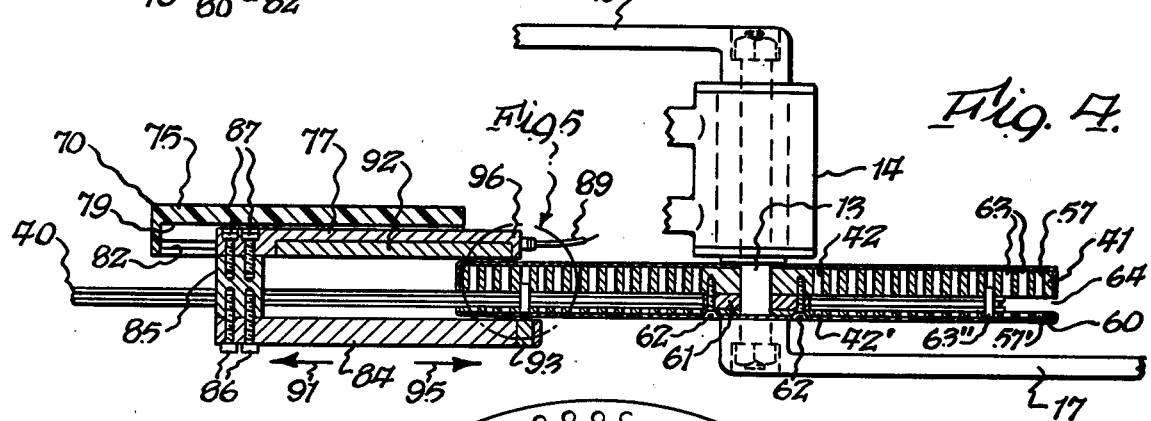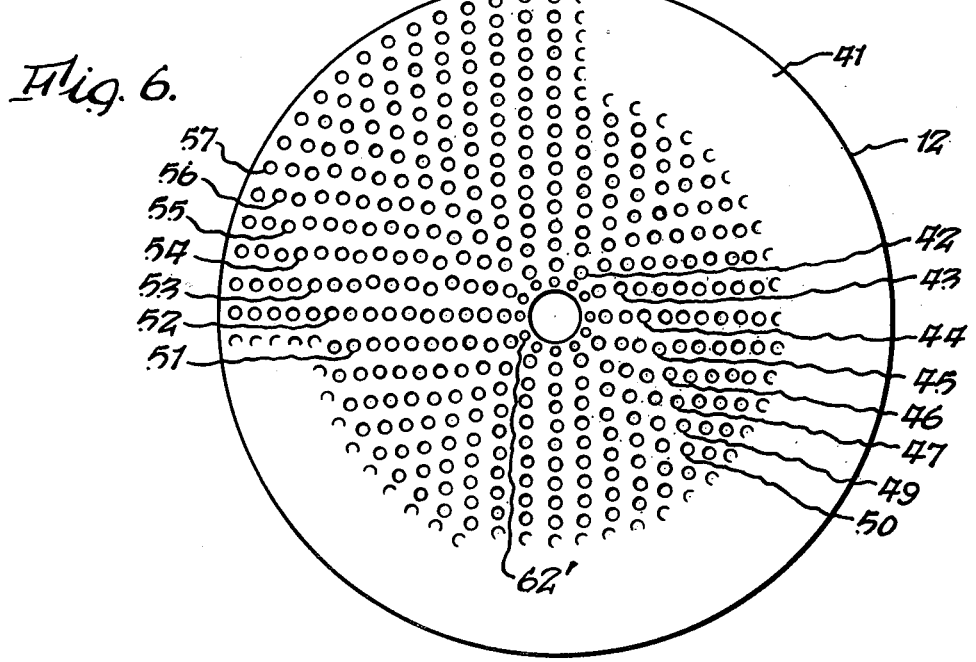

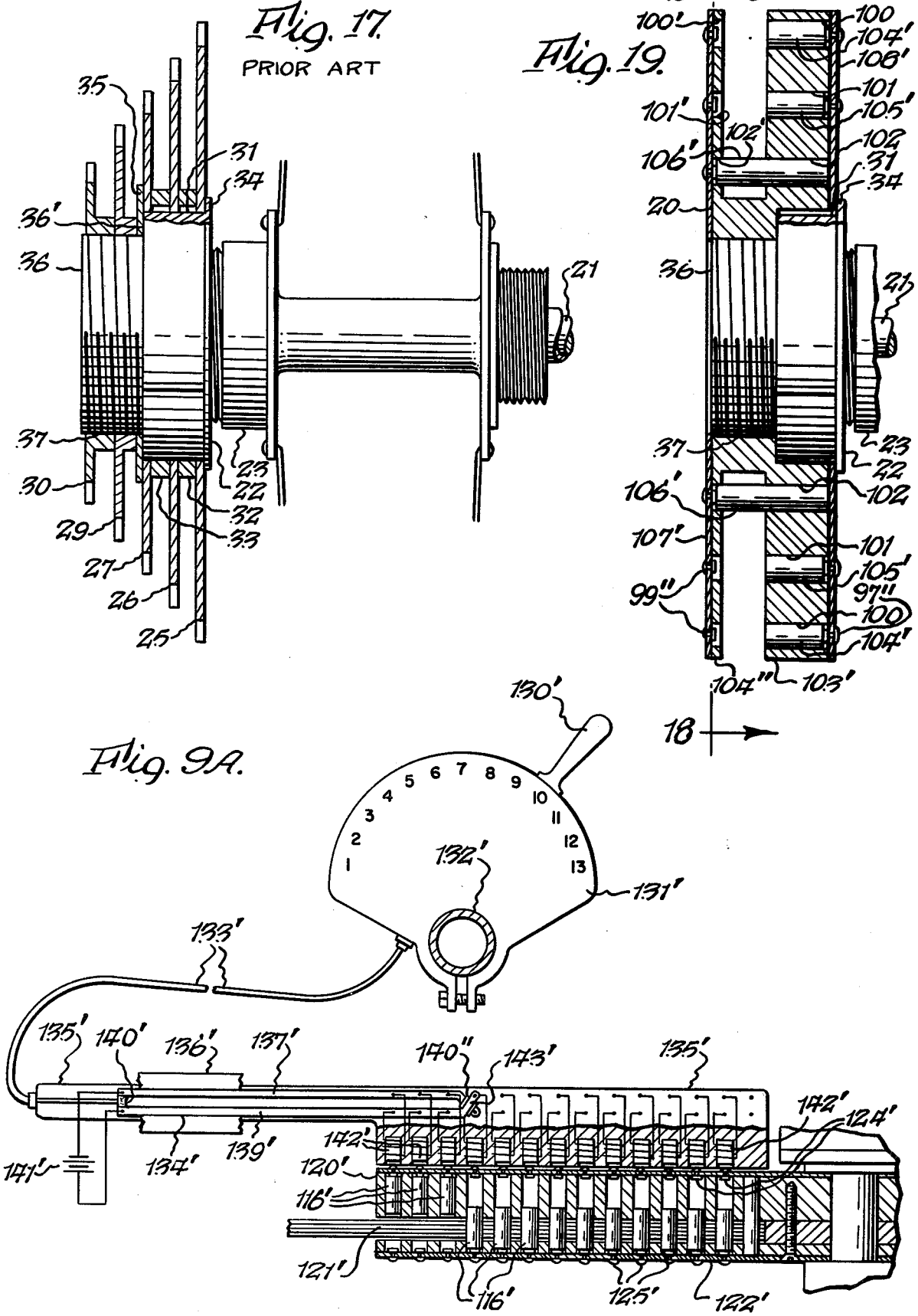

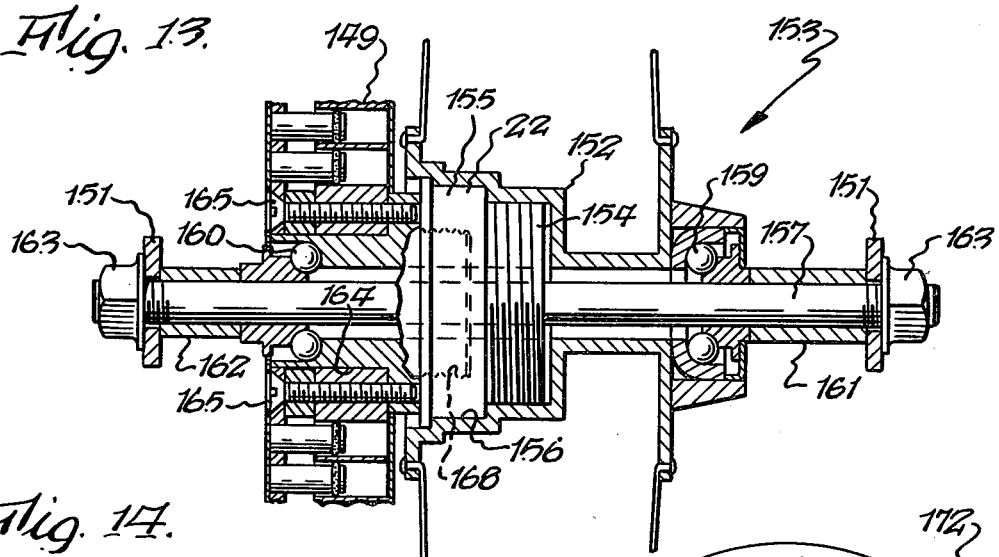
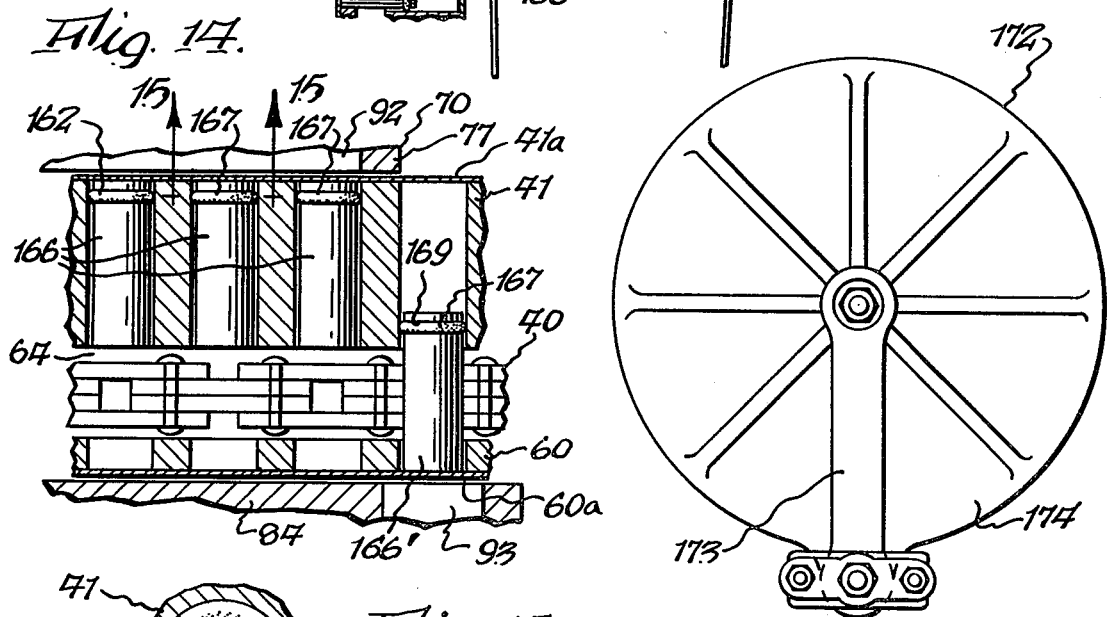
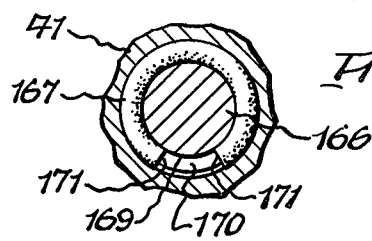
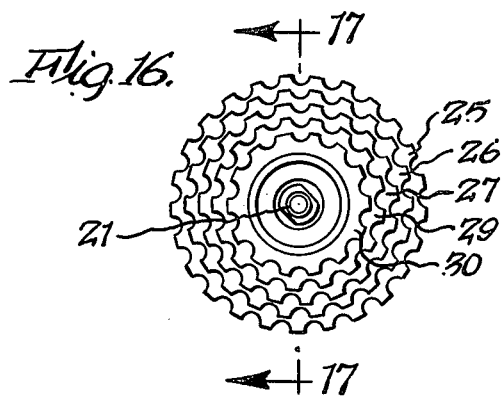
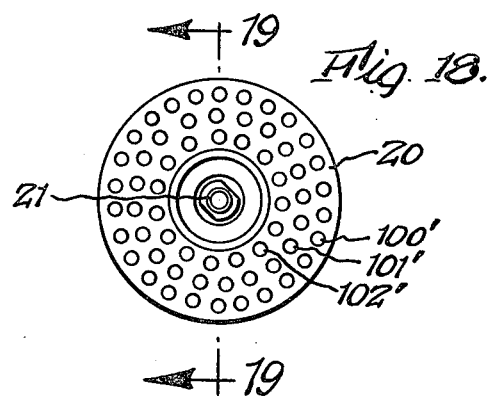

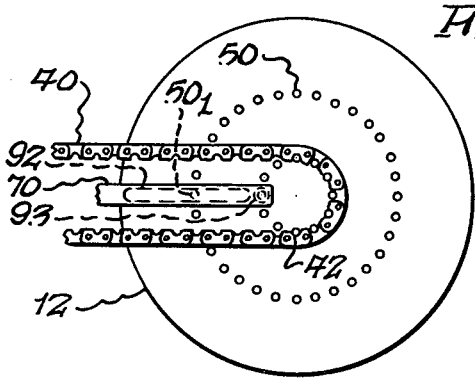
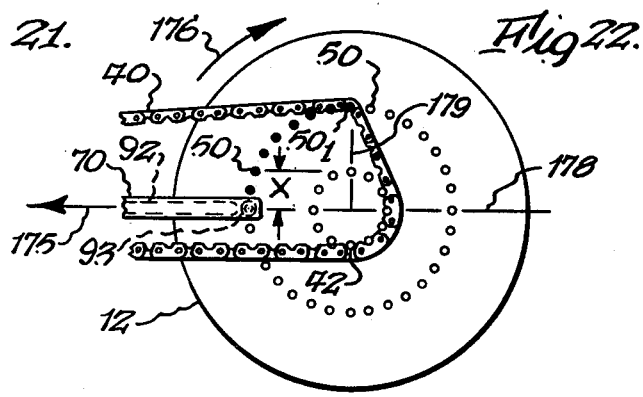
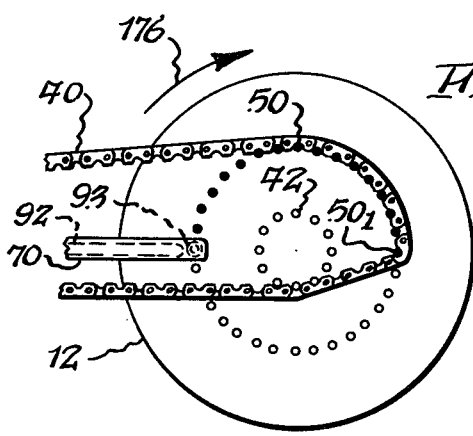
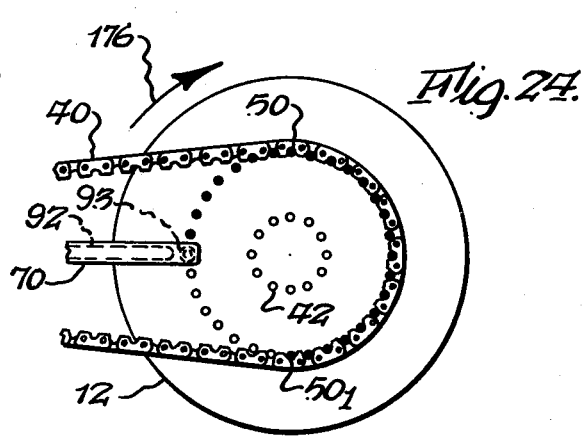
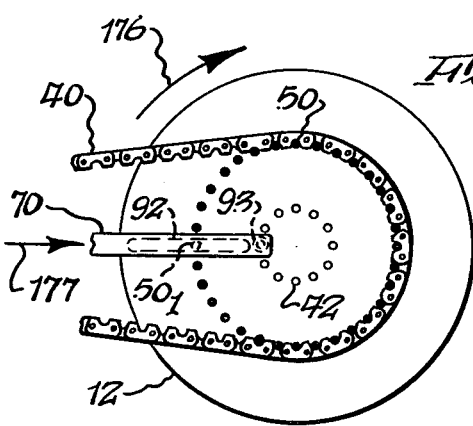
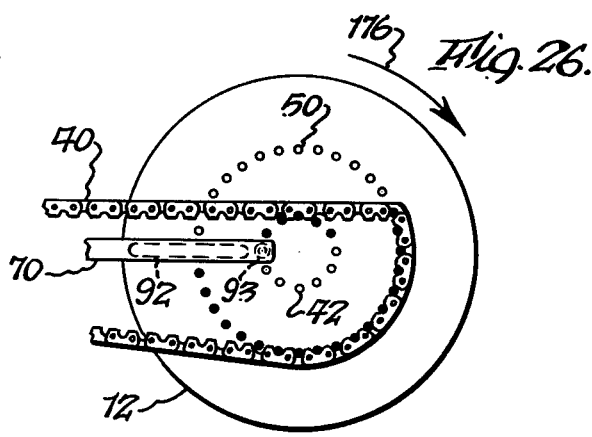
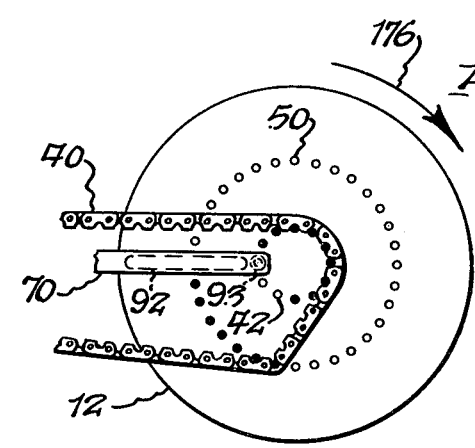
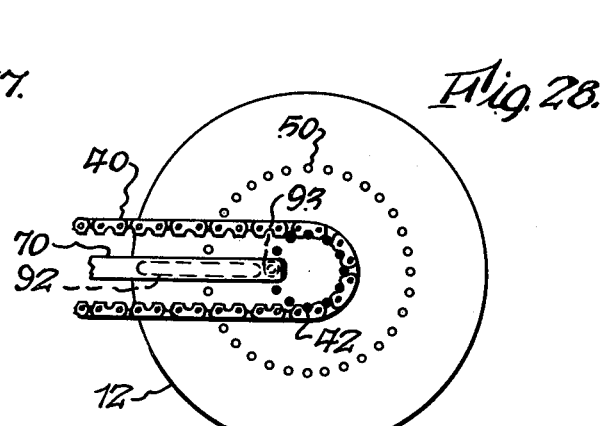

4,457,739

MULTI-RATIO DRIVE

BACKGROUND OF THE INVENTION

The present invention relates to an improved multi-ratio drive for use on bicycles, motorcycles, automobile transmissions, and any other type of device wherein a multi-ratio drive is required.

By way of background, in various applications, such as bicycles, multi-ratio drives are desirable. However, in the past multi-ratio drives were either limited in the number of drive ratios which were obtainable, as in 10 or 15 speed bicycle drives, or, where the drives were infinitely variable, such as in drives utilizing spaced cones, the drive either occupied a relatively large volume, and was therefore impractical for certain applications, or the drive was so complex as to be impractical. In other words, in the prior art there was no satisfactory high multi-ratio drive available for use in a bicycle and other applications which could provide a high number of drive ratios and still occupy a relatively small space and which was not unduly complex.

SUMMARY OF THE INVENTION

It is accordingly one object of the present invention to provide an improved multi-ratio drive for use on a bicycle or the like, which can provide an extremely high number of drive ratios.

Another object of the present invention is to provide an improved multi-ratio drive which in addition to providing an extremely high number of drive ratios, is relatively simple in construction.

A further object of the present invention is to provide an improved multi-ratio drive which can be mounted on an existing bicycle to extend the drive ratio over that which was originally provided on the bicycle.

A still further object of the present invention is to provide an improved hub construction which can be substituted for the existing hub construction on a conventional 10-speed bicycle for the purpose of converting the bicycle into one which can be driven by the improved multi-ratio drive of the present invention. Other objects and attendant advantages of the present invention will readily be perceived hereafter.

The present invention relates to a multi-ratio drive comprising first and second spaced sprockets, an endless flexible member effectively engaging said first and second sprockets to transmit motion therebetween, a plurality of concentric rows of openings in said first sprocket, pins in said openings, and pin-actuating means for selectively extending pins from a retracted position in said concentric rows of openings and retracting said pins into said openings to thereby vary the effective diameter of said first sprocket and thus vary the drive ratio between said first and second sprockets.

The present invention also relates to a variable diameter sprocket construction comprising disc means, a plurality of concentric circular rows of holes in said disc means, and axially movable pins in said disc means for movement between retracted positions in said disc means to extended positions wherein they occupy positions in which project outwardly from said disc means a greater amount than when in said retracted positions.

The present invention also relates to an adapter for converting a chain drive having a one-way clutch having a threaded portion and a plurality of sprocket discs spacedly mounted on said one-way clutch to a pin-drive comprising pin-supporting disc means mounted on a hub, a plurality of pins on said pin-supporting disc means for occupying positions wherein they are positioned in extended or retracted positions between said discs, and a tapped opening in said hub for threadably mounting on said threaded portion of said one-way clutch.

The present invention also relates to a hub construction comprising a hub member, a first opening in said hub member having a first tapped portion for threadably engaging the threaded portion of a one-way clutch, a second opening of larger diameter than said first opening and coaxial therewith and axially spaced therefrom for receiving the clutch portion of a one-way clutch axially spaced from said threaded portion, and a second tapped portion in said clutch portion for threadably mounting a sprocket.

The various aspects of the present invention will be more fully understood when the following portions of the specification are read in conjunction with the accompanying drawings wherein:

BRIEF DESCRIPTION OF THE DRAWINGS

FIG. 3 is a cross sectional view taken substantially along line 3—3 of FIG. 2 and showing the manner in which the shifting mechanism is mounted on the fork of a bicycle;

FIG. 4 is a fragmentary cross sectional view taken substantially along line 4—4 of FIG. 2 and showing the shifting mechanism in relationship to the pin-carrying sprocket;

FIG. 5 is a fragmentary enlarged view of the encircled portion of FIG. 4 and showing in greater detail the pin and sprocket mechanism;

FIG. 6 is a side elevational view of a portion of the sprocket showing the plurality of concentric series of pin-carrying holes therein;

FIG. 9A is a schematic view of a shifting mechanism similar to FIG. 9 but utilizing electromagnets to effect the shifting.

FIG. 13 is a fragmentary cross sectional view taken substantially along line 13—13 of FIG. 12 and showing the rear axle and drive construction which permits a large sprocket to be mounted on a bicycle having a conventional rear fork;

FIG. 14 is a fragmentary cross sectional view similar to FIG. 5 but showing a modified type of pin construction;

FIG. 15 is a fragmentary cross sectional view taken substantially along line 15—15 of FIG. 14 and showing the O-ring construction on the pin for maintaining the pin in the position to which it was moved;

FIG. 16 is a side elevational view of the rear sprocket of a conventional 10-speed bicycle;

FIG. 17 is a cross sectional view taken substantially along line 17—17 of FIG. 16;

FIG. 18 is a side elevational view, taken substantially along line 18—18 of FIG. 19, of a small pin-carrying sprocket made in accordance with the present invention mounted on the rear hub of a conventional 10-speed bicycle for replacing the five conventional sprockets;

FIG. 19 is a fragmentary cross sectional view taken substantially along line 19—19 of FIG. 18;

FIG. 20 is a side elevational view of a modified form of pin-carrying sprocket in which the pedal-supporting crankarm is cast integrally with the sprocket;

FIG. 21 is a schematic view showing the chain encircling protruding pins defining a circle of relatively small diameter;

FIG. 22 is a view similar to FIG. 21 but showing the transition as the chain assumes engagement with a circle of pins of larger diameter while retaining engagement with the circle of pins of smaller diameter;

FIG. 23 is a view similar to FIG. 22 but showing a further step in the transition process;

FIG. 24 is a view similar to FIG. 23 but showing the chain engaging the circle of pins of greater diameter after the transition has been completed;

FIG. 25 is a view similar to FIG. 24 but showing the shifting mechanism moved to cause pins of the smaller diameter circle to protrude and the pins of the larger diameter circle to progressively retract;

FIG. 26 is a view similar to FIG. 25 but showing the chain starting to engage the circle of pins of smaller diameter while retaining engagement with the circle of pins of larger diameter;

FIG. 27 is a view similar to FIG. 26 but showing a further step in the transition as the chain moves onto the smaller diameter circle of pins; and FIG. 28 is a view similar to FIG. 27 but showing the chain in full engagement with the smaller diameter circle of pins.

DESCRIPTION OF THE PREFERRED EMBODIMENTS

Figure 1:
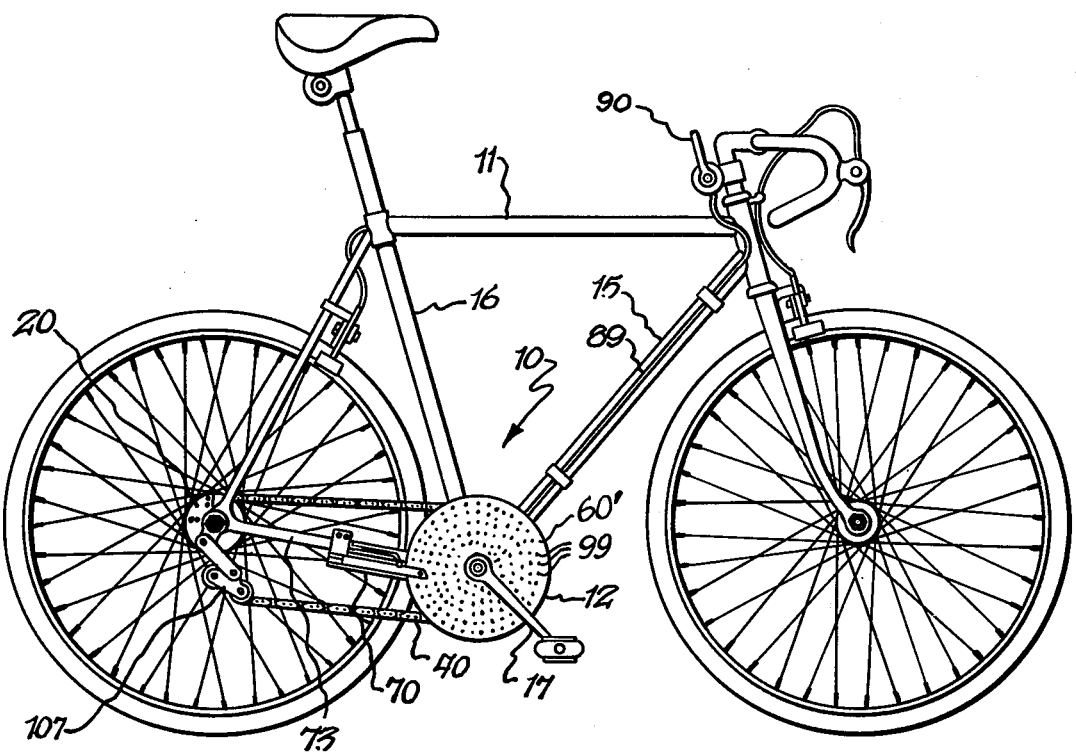
FIG. 1 is a side elevational view of a bicycle mounting the improved multi-ratio drive of the present invention.

One embodiment of the improved multi-ratio drive 10 of the present invention is shown mounted on bicycle 11. It will be appreciated, however, that the multi-ratio drives of the present invention may be used in other applications, such as motorcycles, automobile transmissions and for any other use wherein variable drive ratios are required.

The multi-ratio drive 10 includes a pin-carrying sprocket 12 keyed to shaft 13 which is journalled for rotation in hub 14 (FIG. 4) located at the junction of frame members 15 and 16. Crankarms 17 and 19 are nonrotatably coupled to shaft 13 in any suitable manner. Sprocket 12 and crankarms 17 and 19 may be substituted for the conventional sprocket and crankarms on an existing bicycle. It will be appreciated that by rotating crankarms 17 and 19 in the conventional manner pin-carrying sprocket 12 will also be rotated. A second pin-carrying sprocket 20 (FIGS. 2 and 19) is mounted on shaft 21 instead of the conventional five sprocket wheels (FIGS. 16 and 17) which are normally mounted on this shaft to provide 10-speed operation. The conventional structure is shown in FIG. 17 wherein a one-way clutch 22 is threaded onto enlarged portion 23 of shaft 21 at 24. The one-way clutch 22 may be of the type generally known as a "free wheel" which locks when the shaft 21 is being driven in a clockwise direction in FIG. 2 but which free wheels when the sprockets are being driven in a counterclockwise direction. The conventional sprocket arrangement shown in FIG. 17 includes sprocket wheels 25, 26, 27, 29 and 30. Sprockets 25, 26 and 27 are slid onto enlarged surface 31 of free wheel 22 and are suitably keyed thereto. Spacers 32 and 33 are positioned between the sprocket wheels as shown and a lip 34 prevents sprocket wheel 25 from moving to the right in FIG. 17. A spacer 35 abuts sprocket wheel 27 and shoulder 36' and sprocket wheels 29 and 30 are threaded onto reduced portion 36 at 37 to lock the five sprockets in position.

Figure 7:
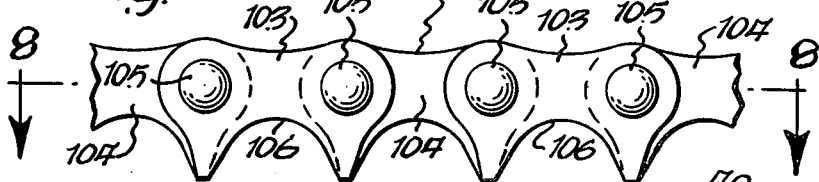
FIG. 7 is a fragmentary side elevational view of the chain which encircles the pins in the sprocket.
Figure 8:
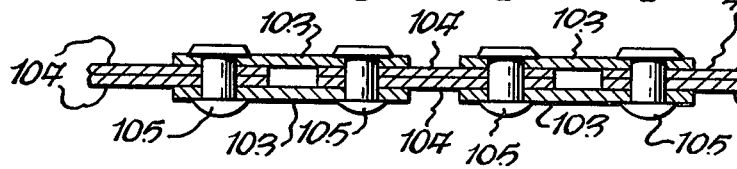
FIG. 8 is a fragmentary cross sectional view taken substantially along line 8—8 of FIG. 7.

In order to mount sprocket 20 (FIGS. 2 and 19) on shaft 21, sprocket wheels 29 and 30 are unscrewed and thereafter sprocket wheels 27, 26 and 25 are slid off of surface 31. Thereafter, the pin-carrying sprocket 20 is threaded onto reduced portion 36. Thus, the free wheel 22 will function in the same manner as it does on a conventional 10-speed bicycle but the pin-carrying sprocket 20 can be used to receive the special type of chain 40 (FIGS. 2, 7 and 8) which encircles pin-carrying sprockets 12 and 20 to effect a drive therebetween.

As shown in FIG. 19, sprocket 20 has three concentric circular rows of holes 100, 101 and 102 in disc 103' and there are three corresponding aligned rows of holes 100', 101' and 102' in disc 104" (FIG. 18) which is spaced from disc 103'. An innermost row of pins 106' is fixedly mounted in the smallest diameter row of holes 102–102'. By the use of a sprocket 20, a conventional rear wheel sprocket construction, such as shown in FIG. 17, may be replaced by one which uses the improved drive of the present invention. The pins 104' and 105' in rows 100 and 101, respectively, may be shifted by the use of a shifter such as described hereafter relative to FIGS. 2, 4, 12, 18 or any of the other figures which show a shifter. The diameter of the extended row of pins in sprocket 20 will determine the drive ratio which is available between it and the various rows of pins in sprocket 12. A representative diameter defined by the pins in outer row 100 is $3\frac{3}{8}$ inches; a representative outer diameter for row 101 is 3 inches; and a representative diameter for row 102 is $2\frac{3}{8}$ inches. A circular plate 107', FIG. 19, is suitably attached to the outside of disc 104" to limit movement of the pins 104' and 105' to the left in FIG. 19. A circular plate 108' is suitably secured to disc 103' to limit the amount of movement of the pins 104' and 105' to the right in FIG. 19. Pins 104' and 105' are fabricated of the same material as the pins carried by sprocket 12, which is described hereafter. Metal pins 97' and 99' are mounted on discs 108' and 107', respectively, for retaining the pins in the positions in which they were last placed by the shifter mechanism. The pins 97" and 99" perform this function in the same manner as pins 97' and 99' described hereafter relative to FIG. 5.

The pin-carrying sprocket 12 includes a main disc 41 (FIGS. 5 and 6) having a plurality of concentric circular rows of pin-carrying holes therein. In this respect, for example, the innermost row 42 includes 12 holes and each succeeding outwardly spaced row includes four more holes. Thus, row 43 has 16 holes, row 44 has 20 holes, row 45 has 24 holes, row 46 has 28 holes, row 47 has 32 holes, row 49 has 36 holes, row 50 has 40 holes, row 51 has 44 holes, row 52 has 48 holes, row 53 has 52 holes, row 54 has 56 holes, row 55 has 60 holes, row 56 has 64 holes, row 57 has 68 holes. The innermost row of holes 62' receive screws 62. Outer row 57 has an outer diameter of 10.25 inches and each succeeding outer row is 0.332 inches smaller in outer diameter than the preceding row, so that inner row 42 has an outer diameter of 5.60 inches. An outer circular plate 60 (FIGS. 4 and 5) is spaced from plate 41 by spacer 61 and plate 60 is attached to plate 41 by screws 62. Plate 60 has the same number of concentric rows of holes as main disc 41, and each of the holes in plate 60 is aligned with a corresponding pin-carrying hole in disc or plate 41. The rows of holes in plate 60 are designated by primed numerals which correspond to the unprimed numerals of disc 41. Each of the holes in disc 41 contains a cylindrical metallic pin 63 and normally these pins are in a retracted position as shown by numeral 63' in FIG. 5. However, one row of pins, denoted by numeral 63", is in an extended position wherein it bridges the space 64 between discs 41 and 60. As will become more apparent hereafter, the pins which lie on smaller diameters than the extended row of pins which is engaged by the chain will also remain in an extended position, and they will not interfere with the engagement between the chain and the outermost row of pins which are in an extended position. The pins 63 are 0.287 inches in diameter and the holes are 0.291 inches in diameter. Chain 40 engages the outer sides of the extended circular row of pins. The drive ratio is determined by the particular row of pins which is in an extended position. It can readily be seen that when a pin occupies an extended position, such as shown as 63" in FIG. 5, the outer end 65 of the pin is received in opening 66 of pin-receiving disc 60 and thus an extended pin, such as 63", has one end supported by opening 66 and its other end supported at 67 in opening 69 from which it was extended.

In order to extend a particular row of pins while causing the remainder outside of this row to remain in a retracted position wherein they do not bridge gap 64, a shifter mechanism 70 (FIGS. 2, 3 and 4) is employed. The shifter mechanism includes a pair of clamping blocks 71 and 72 which are locked onto rear fork 73 by screws 74. A guide block 75 is attached to block 72 by means of a plurality of screws 76. A slidable member 77 is keyed for sliding movement within slot 79 of block 75 with keys 80 and 81 being received in keyways 82 and 83, respectively. A second block 84 is attached to block 85 by screws 86, and block 85 is attached to member 77 by screws 87. Thus, slidable members 77 and 84 will move in unison. The exact position of member 77 in groove 79 is determined by Bowden wire unit 89 which has its central portion secured to frame member 15 and which terminates at control lever 90 at one end and is attached to slidable member 77 at its other end. It will be appreciated that any other type of cable connection can be used. Thus, by manipulating lever 90, slidable member 77, and member 84 attached thereto, may be moved back and forth in the direction of the arrows designated by numerals 91 and 95.

Each of pins 63 (FIG. 5) comprise a magnet having north and south poles as indicated. A magnet 92 is housed in slidable member 77 with its north and south poles as indicated. A magnet 93 is mounted toward the end of slidable member 84 with its north and south poles oriented as indicated. Thus, whenever slidable members 77 and 84 are moved in the direction of arrow 95 in FIG. 4, all pins 63 to the left of the end 96 of slidable member 77 (FIG. 5) will be pulled to a retracted position within disc 41 while the row of pins at 63" which is aligned with magnet 93 will be pulled to the extended position shown in FIG. 5. The rows of pins of lesser diameter than the row in alignment with magnet 93 will remain in an extended position but they will not interfere with the chain because they lie inwardly thereof. The disc 41 and the disc 60 are fabricated from any suitable material, such as plastic, aluminum or suitable steel, which will not intereferе with the above described magnetic action. It can thus be seen that by moving shifting mechanism 77 back and forth in the direction of arrows 91 and 95, and by simultaneously rotating pin-carrying sprocket 12, a predetermined row of pins may be caused to bridge gap or space 64 and the diameter of the particular row of pins which is thus extended will determine the drive ratio produced by rotation of pin sprocket 12. A plastic or metal non-magnetic cover 60' (FIGS. 2, 4 and 5) is suitably attached to disc 60 and a plastic cover 41' is suitably attached to disc 41. Covers 60' and 41' serve to mount metal pins 99 and 97, respectively. They also prevent the accumulation of debris in the various openings on the outsides of discs 41 and 60. At the end of each of the holes 69 in disc 41 a metal member 97 to which a magnet will adhere is fastened on plate portion 41. At the end of each of holes, such as 66 in disc 60, a metal member 99 to which a magnet will adhere is fastened on cover 60'. Alternatively, members formed of plastic impregnated with material to which a magnet will adhere may be used. Instead of being in the same shape as members 97, the plastic members may be in the form of a thin disc (not shown) lying flat and secured in position on the members 41' and 60' at the bottom of bores in which the pins 63 slide. The function of members 97 and 99 is to hold pins 63 in the positions to which they have been moved so that when the bicycle is laid on its side, the pins will not slide out of the positions to which they have been moved.

Figure 2:
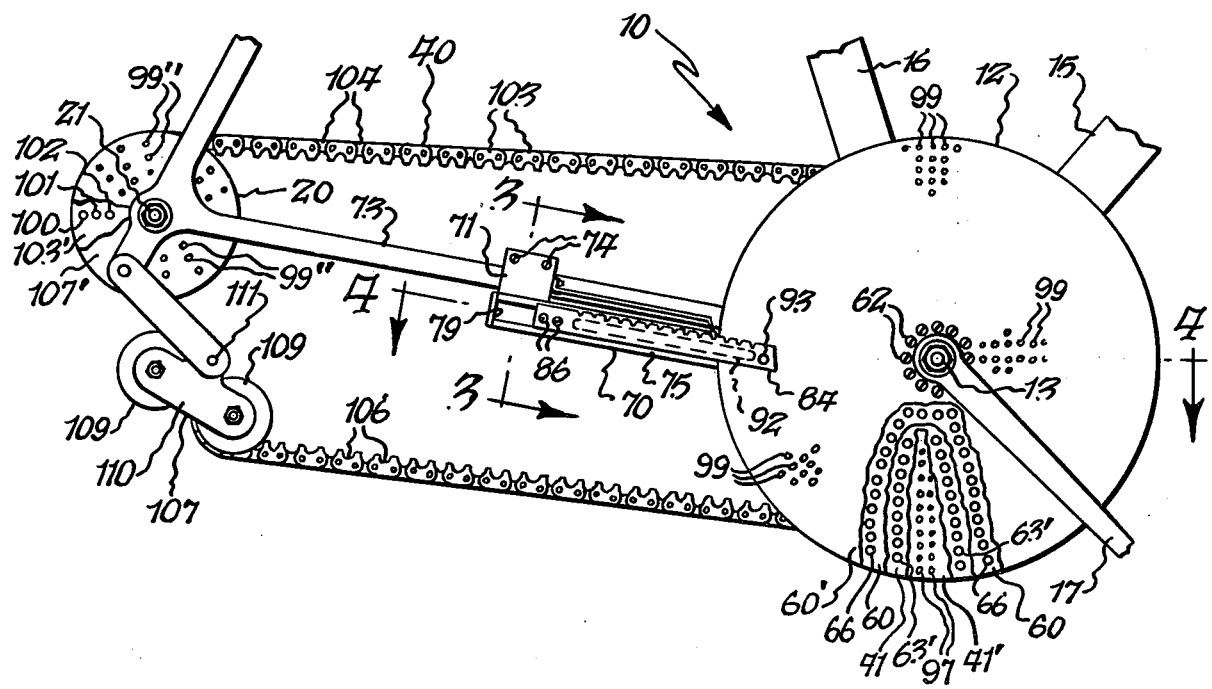
FIG. 2 is a fragmentary side elevational view of the multi-ratio drive of FIG. 1 in enlarged detail.
Figure 12:
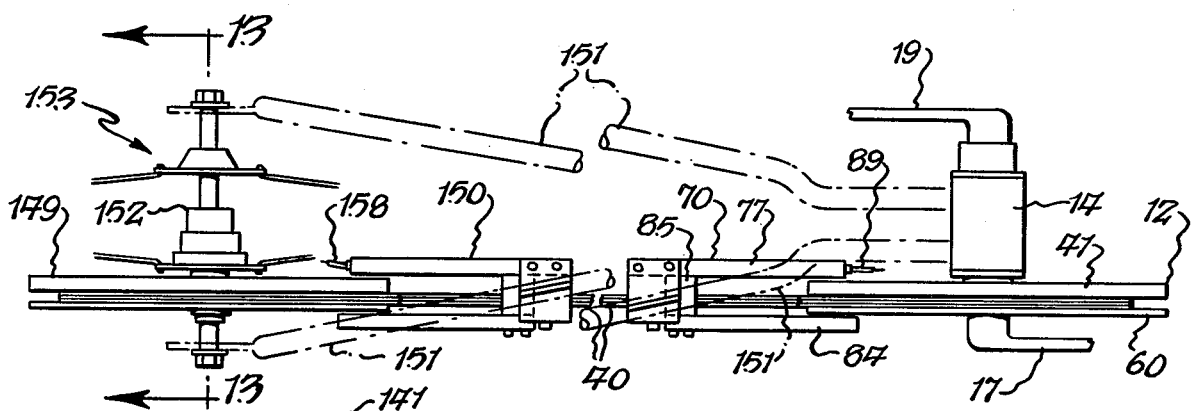
FIG. 12 is a plan view of a modified multi-ratio drive utilizing two large sprockets capable of providing approximately 161 different speeds and also showing in phantom the rear forks of a bicycle relative to which it is mounted.

A shifter mechanism 150, which is shown in FIG. 12 but which is not shown in FIG. 2, is utilized to shift the pins in rows 100 and 101 in rear pin-carrying sprocket 20, as described hereafter relative to FIG. 13. Shifter mechanism 150 may be the mirror image of shifter mechanism 70 described above if the rear sprocket is the same size as sprocket 12, or it may be of a smaller size if the rear sprocket is of a smaller size, as described above relative to FIG. 19. In the embodiment of FIGS. 1–6 there are 15 rows of holes in pin-carrying sprocket 12 and 3 rows of holes in pin-carrying sprocket 20 so that there are 3 times 15 or 45 possible speeds when the pins are shiftable on both the front sprocket 12 and rear sprocket 20.

The endless flexible member or chain 40 (FIGS. 7 and 8) is fabricated from outer links 103 which are pivotally coupled to inner links 104 by means of rivets 105. Links 103 and 104 are identical except for their positions. Links 103 define pin-receiving concavities 106 which engage the outer surfaces of the cylindrical pins in essentially complementary mating driving relationship. In order to maintain chain 40 taut, a conventional tensioning member 107 (FIG. 2) is provided having spaced wheels 109 around which chain 40 winds, as shown in FIG. 2, with member 110 on which wheels 109 are rotatably mounted being tensioned by a spring (not shown) in a clockwise direction about pivot pin 111, as is well known in the art.

Figure 9:
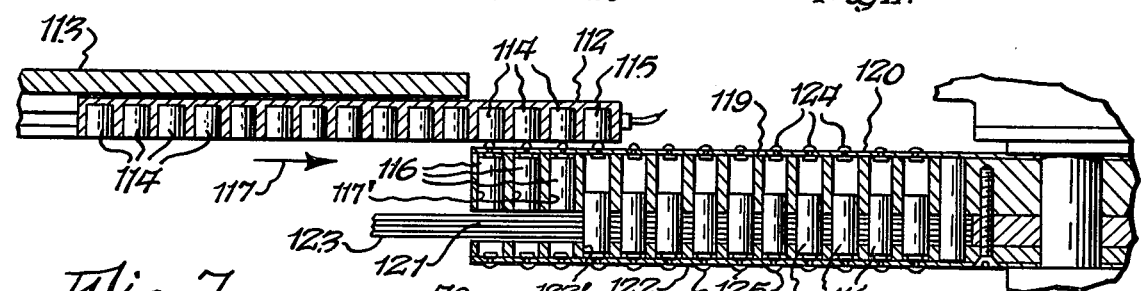
FIG. 9 is a fragmentary cross sectional view similar to FIG. 4 but showing a modified form of shifting mechanism and sprocket wheel utilizing magnets to effect the shifting.

In FIG. 9 a modified form of shifting mechanism is disclosed. In this embodiment a slidable member 112 is provided on block 113 which is attached to the bicycle fork. Slidable member 112 is analogous to slidable member 77 of FIG. 4. A plurality of magnets 114 are carried by slidable member 112. Members 114 have their north and south poles oriented in a first direction. The end magnet 115 has its poles oriented in the opposite direction. Magnets 114 will attract pins 116 which are magnets. Magnet 115 will repel magnetic pins 116. Thus, as slidable member 112 is moved in the direction of arrow 117, all of the magnetic pins 116 which are aligned with magnets 114, will be pulled into a retracted position into the openings 117' in disc 119 of pin-carrying sprocket 120. The row of magnets 116 which is aligned with magnet 115 will be moved to an extended position wherein they bridge the gap 121 between disc 120 and disc 122, which receives the outer ends of magnetic pins 116 in openings 123'. As can be seen from FIG. 9, chain 123 passes through the space 121. In the embodiment of FIG. 9 disc 120 and disc 122 are fabricated of nonmagnetic material and metal pins 124 and 125 to which magnets will adhere are provided in discs 120 and 122, respectively, to hold the magnets in either an extended or a retracted position, that is, to hold the pins 116 in the position in which they were last placed by magnets 114 and 115 so as to prevent the magnets from sliding to another position when the bicycle is laid on its side.

In FIG. 9A a modification of the embodiment of FIG. 9 is shown. In FIG. 9A electromagnets are utilized to shift magnetic pins 116' from their retracted position in disc 120' to their extended position wherein they bridge the gap 121' between disc 120' and disc 122'. In this respect, a lever 130' is provided on an indicator dial 131' mounted on the handlebars or other suitable portion 132' of the bicycle. A bowden wire unit 133' extends between handle 130' and slidable conductor member 134' which is slidable on a base member 135' suitably secured to the fork 136' of the bicycle. Conductor member 134' includes two conductive rods 137' and 139' which are separated by insulators 140' and 140". A battery 141' has its opposite ends connected to conductor rods 137' and 139'. A plurality of electromagnets 142' are also mounted on block 135'. As member 134' slides, it will bridge the contacts at the ends of each coil of each electromagnet 142' so that when the member 134' is in the position shown in the drawings, the polarity of the three left electromagnets 142' will be such that magnetic pins 116' will be in the retracted position within disc 120'. However, as can be seen from the drawing, the ends of conductors 137' and 139' are crossed at 143' and there is an insulator 140" between the crossed ends. In view of the foregoing, the polarity to the electromagnet 142', which is fourth from the left, will be reversed from those to the left of it in FIG. 9A. Therefore, magnetic pin 116', which is aligned with the electromagnet which has its polarity reversed, will bridge the gap 121'. It can therefore be seen that as the slidable member 134' is shifted to the right in FIG. 9A from the position shown, the pins 116' will be pulled into disc 120' at all points to the left of the crossed conductors at 143', while all of the pins 116' to the right of the crossed conductors 143' will remain in a position wherein they bridge gap 121'. Pins 124' and 125' are provided at the ends of the bores in which pins 116' ride, in both disc 120' and disc 122'. These pins are analogous to pins 124 and 125 of FIG. 9 and are made of a metal to which magnets will adhere so that they will hold magnetic pins 116' in the position in which they were last placed by the actions of electromagnets 142'. This prevents the pins 116' from sliding to another position when the bicycle is laid on its side. Discs 120' and 122' are fabricated of nonmagnetic material so as not to interfere with the magnetic action described above.

Figure 11:
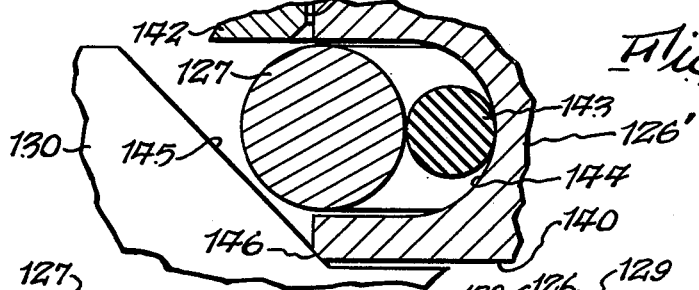
FIG. 11 is an enlarged view of the encircled portion of FIG. 10.
Figure 10:
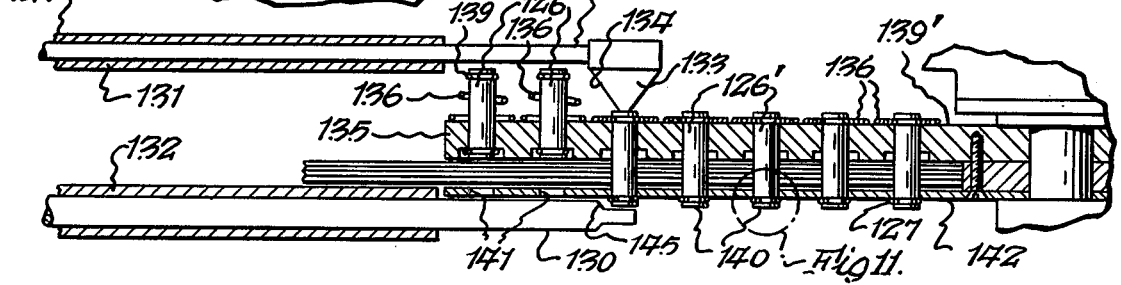
FIG. 10 is a fragmentary cross sectional view similar to FIG. 9 but showing a modified shifting mechanism and sprocket which utilizes mechanical contact to shift the pins.

In FIGS. 10 and 11 a further modified form of the present invention is disclosed wherein the pins 126 are moved between extended and retracted positions by shifter mechanism 127 which includes a slider member 129 coupled for movement in unison with slider member 130. Slider member 129 slides in block 131 and slider member 130 slides in block 132, both of which are suitably attached to the fork of the bicycle. Slider member 129 includes a cam member 133 having a cam surface 134 thereon. Pins 126 at the left end of pin-carrying sprocket 135 are shown in the fully retracted position wherein springs 136 are expanded and they extend between the rear edge 139' of disc 135 and the ends 139 of pins 126. In order to move a pin 126 from the retracted position shown at the left of disc 135 to an extended position designated by numeral 126', the cam surface 134 engages the outer end of pin 126 and forces it downwardly in FIG. 10 until it reaches a position, such as shown at 126'. In this position the end 140 of pin 126 will extend through opening 141 in disc 142. A first O-ring 143 is mounted in annular groove 144 in pin 126 and a metal snap ring 127 is also mounted in annular groove 144, with the outer portion of metal snap ring 127 extending beyond the outer circumference of pin 126. Therefore, when pin 126 reaches the position shown for pin 126', metal snap ring 127 will retain it in an extended position. In order to cause pin 126' to return to the retracted position of pins 126, a cam surface 145 on slider member 130 engages the end portion 146 of pin 126' in its extended position and forces metal snap ring 127 into opening 141, whereupon spring 136 will expand from the contracted position to its expanded position to draw the pin back to the position designated by numeral 126.

In FIGS. 12 and 13 a further modified form of the present invention is disclosed wherein the rear pin-carrying sprocket 149 is identical to front pin-carrying sprocket 12 and wherein the rear shifter mechanism 150 is essentially the mirror image of the front shifter mechanism 70. Therefore, it is believed that a detailed description of rear pin-carrying wheel 149 and rear shifter mechanism 150 is not necessary. Rear shifter mechanism 150 is actuated by a Bowden wire unit 158 which has a control lever (not shown) analogous to control lever 90 mounted on the handlebars. Ordinarily when the rear shaft 21 (FIG. 17) mounts the free wheel 23 in the conventional manner, the spacing between the outside of the bicycle and the rear fork 151 of the bicycle is such that only a relatively small pin-carrying wheel, such as 20 (FIGS. 1, 2 and 19), can be mounted on the rear wheel. However, in accordance with the present invention, the free wheel one-way clutch device 22, such as shown in FIGS. 17 and 19, is mounted in a specially designed hub or axle 153 (FIGS. 12 and 13) so as to provide the added space needed to permit mounting of a relatively large pin-carrying sprocket 149, which is the same size as pin-carrying sprocket 12. Thus, since each pin-carrying sprocket has 15 rows of holes, there is a possibility of 225 different drive combinations. However, since certain of these combinations provide the same ratio as other combinations, the effective number of actual combinations is approximately 161, to provide 161 different ratios.

The rear hub 153 of FIG. 13 includes a housing 152 which receives the threaded portion 154 of free wheel unit 22 in threaded relationship, with the unthreaded portion 155 of the free wheel 22 being received in hub portion 156. The housing portion 152 is journalled on shaft 157 by bearings 159 and 160. Portions 161 and 162 are spacers between the rear forks 151 of the bicycle which are secured in position by nuts 163. The rear pin-carrying sprocket 149 is mounted on hub portion 164 and secured thereto by screws 165. Hub portion 164 is threaded into the free wheel 22 at 168 for rotation therewith.

In FIG. 14 a modified type of pin arrangement is shown, and this pin arrangement is actually an enlargement of the arrangement shown in FIG. 13. In this arrangement a shifter mechanism 77 may be identical to that described above relative to FIGS. 4 and 5. The pin-carrying disc 41 includes the plurality of concentric rows of holes. A magnet 92 is carried by member 41. A slidable member 84 carries a magnet 93. Up to this point the shifter mechanism 70 is identical to that described above relative to FIGS. 4 and 5. However, in the embodiment in FIG. 14, the pins 166 are made out of magnetic material, such as steel, but they are not magnetized, and each of them carries a split O-ring 167 which is received in a groove 169. It can be seen that there is a gap 170 between the ends 171 of the O-ring. When the shifter mechanism 70 is in the position shown in FIG. 14, pins 166 will be attracted by magnet 92 and pin 166' will be attracted by magnet 93 so that pin 166' will bridge the gap 64 between pin-carrying disc 41 and pin-receiving disc 60. The O-rings 167 will cause the pins 166 to remain in the position in which they were last placed by the magnets so that when the bicycle is laid on its side, the pins 166 will not slide away from the position in which they were last positioned. It can also be appreciated that pins 166 and 166' may be magnetized, and this will permit the use of smaller magnets in the shifting mechanism and will also produce a faster action as they slide between the retracted positions designated by numeral 166 and the extended position designated by numeral 166'. Plates 41a and 60a of non-magnetic material are suitably secured to the outsides of discs 41 and 60, respectively, to prevent the pins 166 from moving beyond the plates.

In FIG. 20 a modified form of pin disc 172 is shown in which the crankarm 173 is essentially an integrally molded part of the pin-receiving disc 174 which is analogous to pin-receiving disc 60 of FIG. 14. By integrating the crankarm into a molded pin-receiving disc, the cost is reduced.

In FIGS. 21-28 there is a schematic showing of how the improved multi-ratio drive 10 of the present invention operates. For example, in FIG. 21 the chain 40 encircles row 42 defined by the extended pins in this row. When it is desired to shift to another row of pins, for example, to row 50, the shifter mechanism 70 is moved in the direction of arrow 175. This will cause the pins in row 50 to bridge the gap 64 and thus assume their extended position. Each of the pins in row 50 will become sequentially extended as the pin-carrying disc 12 rotates in the direction of arrow 176. A point will be reached where the first pin $50_1$ will have engaged chain 40 and lifted it away from the pins in row 42. Continued rotation of pin-carrying sprocket 12 in the direction of arrow 176 will next result in chain 40 reaching the position shown in FIG. 23 at which point contact is practically lost with the pins of row 42. Finally, a sufficient number of pins will be extended from row 50 so that chain 40 now is being driven solely by all of the pins in row 50. Continued rotation in the direction of arrow 176 will cause the remainder of the pins in row 50 to become extended and this condition will continue until there is a subsequent shifting. It is to be noted, however, that all of the pins in row 42 will remain extended and this will not affect operation of the drive because the circle of pins in row 42 is within the circle of pins within row 50. Furthermore, certain select pins in the rows between rows 42 and 50 may be moved into their extended position due to the wiping of shifter mechanism 70 across such rows as it moves radially outwardly. However, here again, the extended pins are within the radius of row 50 and thus will not interfere with the operation of driving chain 40 by row 50.

In order to move the chain from a row of pins of larger diameter onto a row of pins of lesser diameter, the shifter mechanism 70 is moved inwardly in the direction of arrow 177 of FIG. 25. This will cause the magnet 92 (FIG. 4) to attract all of the pins with which it is in alignment and thus as such pins in rows 50 and the rows between row 50 and row 42 pass the magnet, they will be pulled into a retracted position designated by pins 166 in FIG. 14. Continued movement of pin-carrying sprocket 12 in the direction of arrow 176 will cause the chain 40 to drop down onto the pins of row 42 as shown in FIG. 26. Continued rotation of sprocket 12 in the direction of arrow 176 will cause chain 40 to assume the position shown in FIG. 27 and ultimately chain 40 will assume the position shown in FIG. 28 wherein it is being driven by the pins in row 42.

It is to be especially noted that the transition from one row to another is extremely smooth. There is no abrupt shock in moving from one row to another, whether there is movement from the smallest row to the largest row or movement between any of the intermediate rows. In this respect, it can be seen from a comparison of FIGS. 21 and 22 that the first pin of row 50 which engages the chain will be the same distance X from diameter 178 as is the pin in row 50 on diameter 179. Continued movement of the sprocket in the direction of arrow 176 will cause the chain 40 to be lifted gradually as the pin 50 raises the chain. In other words, there is no abrupt shock due to the change in ratio. There is a gradual transition from one ratio to another. This same characteristic is realized when moving the chain from a larger diameter row of pins to a smaller diameter row of pins, and this can be seen in FIG. 26. In this respect, as the pins in row 50 are retracted as they pass shifter mechanism 70, the diameter of the pin row will decrease and the upper run of chain 40 will gradually lower itself until it engages the extended pins in row 42. Thereafter, there will be a smooth transition onto row 42 as shown in FIGS. 27 and 28. Thus, here again, there is no abrupt jarring experienced during the shifting operation.

While all of the pins and their associated bores described above are of circular cross-section, it will be appreciated that the pins and the bores in which they slide can be made of any other suitable cross-section, such as square, diamond-shaped, or any other suitable shape.

In the above description reference was made to pins made of magnetic material. This may include pins having a plastic matrix with magnetic material therein. In the appropriate instances, such pins can be magnetized to act as magnets and in other instances they need only be capable of being attracted by magnets, but need not be magnetized.

It can thus be seen that the improved multi-ratio drive of the present invention is manifestly capable of achieving the above-enumerated objects, and while preferred embodiments have been disclosed, it will be appreciated that the present invention is not limited thereto, but may be otherwise embodied within the scope of the following claims.

What is claimed is:

1. A multi-ratio drive comprising first and second spaced sprockets, an endless flexible member effectively engaging said first and second sprockets to transmit motion therebetween, a plurality of concentric rows of openings in said first sprocket, pins in said openings, first pin-actuating means for selectively extending pins from a retracted position in said concentric rows of openings, and second pin-actuating means for retracting said pins into said openings by magnetic action to thereby vary the effective diameter of said first sprocket and thus vary the drive ratio between said first and second sprockets.

2. A multi-ratio drive as set forth in claim 1 including a plurality of second concentric rows of openings in said second sprocket, second pins in said second openings, and second pin-actuating means for selectively extending and retracting said second pins from said second concentric rows of openings to thereby vary the drive ratio between said first and second sprockets.

3. A multi-ratio drive as set forth in claim 1 wherein said endless flexible member comprises a chain including concave links for mating engagement with said pins.

4. A multi-ratio drive as set forth in claim 1 wherein said first sprocket includes a first disc in which said openings are located, a second disc coaxial with and axially spaced from said first disc to define a space therebetween for receiving said endldss member, said first disc supporting first ends of said pins in their extended positions, and second openings in said second disc in alignment with corresponding openings in said first disc for supporting second ends of said pins in their extended positions.

5. A multi-ratio drive as set forth in claim 4 wherein said openings in said first sprocket are of sufficient depth to receive said pins substantially in their entireties when said pins are retracted.

6. A multi-ratio drive as set forth in claim 4 including means for retaining said pins in either said extended or retracted positions in which they were placed.

7. A multi-ratio drive as set forth in claim 1 including means for retaining said pins in either said extended or retracted positions in which they were placed.

8. A multi-ratio drive comprising first and second spaced sprockets, an endless flexible member effectively engaging said first and second sprockets to transmit motion therebetween, a plurality of concentric rows of openings in said first sprocket, pins in said openings, and pin-actuating means for selectively extending pins from a retracted position in said concentric rows of openings and retracting said pins into said openings to thereby vary the effective diameter of said first sprocket and thus vary the drive ratio between said first and second sprockets, said pins consisting of magnetic material and said pin-actuating means comprising magnets.

9. A multi-ratio drive as set forth in claim 8 wherein said pins are magnets.

10. A multi-ratio drive comprising first and second spaced sprockets, an endless flexible member effectively engaging said first and second sprockets to transmit motion therebetween, a plurality of concentric rows of openings in said first sprocket, first pins in said openings, first pin-actuating means for selectively extending said first pins from a retracted position in said concentric rows of openings and retracting said first pins into said openings to thereby vary the effective diameter of said first sprocket and thus vary the drive ratio between said first and second sprockets, a plurality of second concentric rows of openings in said second sprocket, second pins in said second openings, and second pin-actuating means for selectively extending and retracting said second pins from said second concentric rows of openings to thereby vary the drive ratio between said first and second sprockets, said first pins consisting of magnetic material and said first pin-actuating means comprising magnets.

11. A multi-ratio drive as set forth in claim 2 wherein said pins are magnets.

12. A multi-ratio drive comprising first and second spaced sprockets, an endless flexible member effectively engaging said first and second sprockets to transmit motion therebetween, a plurality of concentric rows of openings in said first sprocket, pins in said openings, first pin-actuating means for selectively extending pins from a retracted position in said concentric rows of openings by magnetic action, and second pin-actuating means for retracting said pins into said openings to thereby vary the effective diameter of said first sprocket and thus vary the drive ratio between said first and second sprockets.

13. A multi-ratio drive as set forth in claim 12 including a plurality of second concentric rows of openings in said second sprocket, second pins in said second openings, and second pin-actuating means for selectively extending and retracting said second pins from said second concentric rows of openings to thereby vary the drive ratio between said first and second sprockets.

14. A variable diameter sprocket construction comprising disc means, a plurality of concentric circular rows of holes in said disc means, axially movable pins in said holes, means for mounting said axially movable pins for rotation with said disc means without rotation about their axes as said disc means rotates, and means for selectively moving pins of certain of said rows substantially solely in a direction axially of said pins to cause said pins of certain of said rows to move between retracted positions in said disc means to extended positions wherein they project outwardly from said disc means a greater amount than when in said retracted positions.

15. A variable diameter sprocket construction comprising disc means, a plurality of concentric circular rows of holes in said disc means, axially movable pins in said disc means, peripheral disc surfaces surrounding said holes, means for selectively moving pins in certain of said rows between retracted positions in said disc means to extended positions in which they project outwardly from said disc means a greater amount than when in said retracted positions, said axially movable pins being entirely supported solely by said peripheral disc surfaces, and means for rotating as a unit said pins and all portions of said disc means including all portions of said peripheral disc surfaces which support said pins.

16. A variable diameter sprocket construction as set forth in claim 15 wherein said disc means comprises a first disc for solely supporting said pins in said retracted positions, and a second disc spaced from said first disc for supporting said pins jointly with said first disc in their extended positions.

17. A variable diameter sprocket construction as set forth in claim 16 including means for retaining said pins in either said extended or retracted positions in which they were placed.

18. A variable diameter sprocket construction comprising disc means, a plurality of concentric circular rows of holes in said disc means, axially movable pins in said holes, peripheral disc surfaces surrounding said holes, and moving means located substantially entirely externally of said disc means for selectively moving pins of certain of said rows between retracted positions in said disc means and extended positions in which they project outwardly from said disc means a greater amount than when in said retracted positions, said axially movable pins being entirely supported solely by said peripheral disc surfaces, and means for rotating as a unit said pins and all portions of said disc means including all portions of said peripheral disc surfaces which support said pins.

19. A variable diameter sprocket construction comprising disc means, a plurality of concentric circular rows of holes in said disc means, axially movable pins in said holes, and means for selectively moving pins of certain of said rows in a direction axially of said pins to cause said pins of certain of said rows to move between retracted positions in said disc means to extended positions wherein they project outwardly from said disc means a greater amount than when in said retracted positions, said axially movable pins being substantially cylindrical throughout their lengths.

20. A multi-ratio drive comprising first and second spaced sprockets, an endless flexible member effectively engaging said first and second sprockets to transmit motion therebetween, a plurality of concentric rows of openings in said first sprocket, pins in said openings, pin-actuating means for selectively extending pins from a retracted position in said concentric rows of openings and retracting said pins into said openings to thereby vary the effective diameter of said first sprocket and thus vary the drive ratio between said first and second sprockets, said pins including first and second outer ends and a central portion therebetween, said pin-actuating means being located in contiguous relationship to at least said first outer ends and closer to said first outer ends than to said central portion, and retaining means located proximate at least one of the outer ends of said pins for retaining said pins in either said extended or retracted positions in which they were placed.

21. A multi-ratio drive as set forth in claim 20 wherein said first sprocket includes an outer side, and wherein said retaining means comprises a member mounted on said outer side of said first sprocket.

22. A variable diameter sprocket construction comprising disc means, a plurality of concentric circular rows of holes in said disc means, axially movable pins in said holes, moving means located substantially entirely externally of said disc means for selectively moving pins of certain of said rows between retracted positions in said disc means and extended positions in which they project outwardly from said disc means a greater amount than when in said retracted positions, and means for moving said moving means in a path generally radially of said disc means.

23. A variable diameter sprocket construction comprising disc means, a plurality of concentric circular rows of holes in said disc means, axially movable pins in said holes, and moving means located substantially entirely externally of said disc means for selectively moving pins of certain of said rows between retracted positions in said disc means and extended positions in which they project outwardly from said disc means a greater amount than when in said retracted positions, said pins including first and second outer ends and a central portion therebetween, and said moving means being located in contiguous relationship to at least said first outer ends and closer to said first outer ends than to said central portion.

24. A variable diameter sprocket construction as set forth in claim 23 wherein said moving means is also located in contiguous relationship to said second outer ends.

* * * * *

UNITED STATES PATENT AND TRADEMARK OFFICE
CERTIFICATE OF CORRECTION

PATENT NO. : 4,457,739

DATED : July 3, 1984

INVENTOR(S) : Richard W. Iseman

It is certified that error appears in the above-identified patent and that said Letters Patent are hereby corrected as shown below:

Column 12, line 22 (claim 11), change "2" to --10--.

Signed and Sealed this

Fourth Day of December 1984

[SEAL]

Attest:

GERALD J. MOSSINGHOFF

Attesting Officer     Commissioner of Patents and Trademarks